May 10, 1966 C. H. ESLINGER 3,250,220
WAVE PUMP
Filed Jan. 29, 1964 2 Sheets-Sheet 1

Clem H. Eslinger
INVENTOR.

May 10, 1966 — C. H. ESLINGER — 3,250,220
WAVE PUMP
Filed Jan. 29, 1964 — 2 Sheets-Sheet 2

Clem H. Eslinger
INVENTOR.

United States Patent Office 3,250,220
Patented May 10, 1966

3,250,220
WAVE PUMP
Clem H. Eslinger, 557 E. Baseline, Hillsboro, Oreg.
Filed Jan. 29, 1964, Ser. No. 341,075
5 Claims. (Cl. 103—70)

This invention relates to a novel and useful apparatus for pumping sea water by harnessing the buoyancy of the rise and fall of sea water due to wave action.

The wave pump of the instant invention is primarily designed to pump and elevate sea water to a height enabling its head pressure to be utilized to power various types of machinery and the like. By pumping sea water to a higher elevation by means of the wave action of the open sea, many types of power may be derived from the head pressure of the elevated sea water. The wave pump may have its outlet communicated with water turbines for driving electric generators and other types of industrial machinery and for also driving various types of fluid pumps.

The wave pump of the instant invention utilizes a buoyant float which is guidingly supported for vertical reciprocation and which is supported by its buoyancy in a body of water communicated with the open sea whereupon the body of water will rise and fall with the wave action of the sea. The reciprocation of the buoyant float caused by the rise and fall of the water by which it is buoyed up is operatively connected to a fluid pump of novel design for the purpose of elevating portions of the body of sea water by which the buoyant float is supported. However, it is to be noted that the wave pump of the instant invention could also, by means of known structures, directly transfer the reciprocal movement of the buoyant float into rotary movement of a journaled output shaft.

A main object of this invention is to provide an improved wave pump for elevating sea water by means of the buoyant force of the rise and fall of the open sea caused by waves.

Another object of this invention, in accordance with the immediately preceding object, is to provide a vertically reciprocal buoyant float including means operatively associated with and forming a part of a novel fluid pump whereby the rise and fall of the buoyant float may be directly utilized as a means to actuate the fluid pump.

A still further object of this invention is to provide the fluid pump with water outlet means including a closed air chamber having an outlet therein disposed below the upper end thereof whereby the inherent intermittent discharge of fluid pumped by means of the fluid pump may be made constant.

Another important object of this invention is to provide support means for supporting the buoyant float for vertical reciprocation defining an open-sided cavity including a bottom and a partial sea wall extending across the open side of the cavity and terminating at its lower end a spaced distance above the bottom of the cavity and with the lower end of the sea wall disposed below the minimum level of the open sea whereby a stilling basin is formed within the cavity communicated with the open sea with the sea wall absorbing the horizontal force of the waves of the open sea impinging thereon. In this manner, the sea water within the stilling basin will be sheltered from the direct force of the waves of the open sea and yet communicated with the latter whereby the water disposed therein will rise and fall as the water level rises and falls on the outside of the sea wall due to wave action of the open sea.

A final object of this invention to be specifically enumerated herein is to provide a wave pump in accordance with the preceding objects which will conform to conventional forms of manufacture, be of simple construction and automatic in operation so as to provide a device that will be economically feasible, long-lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
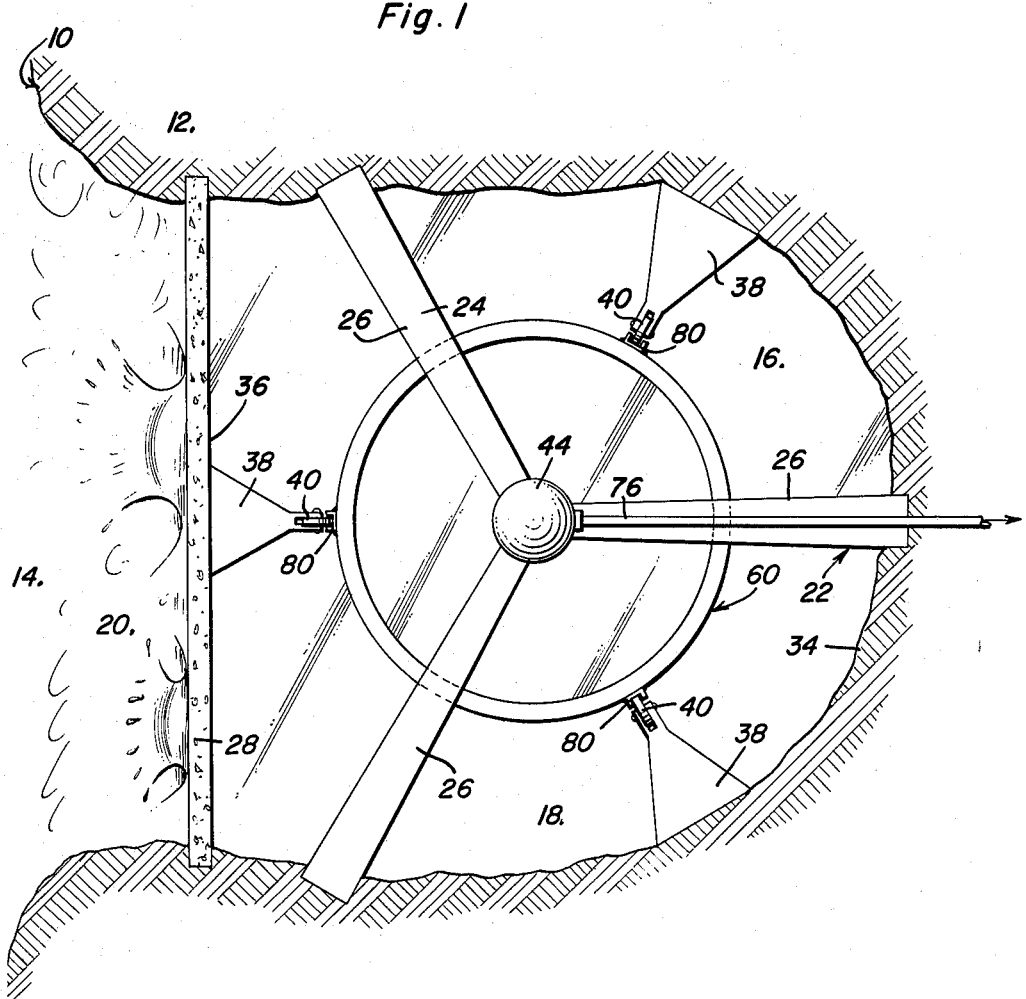
FIGURE 1 is a top plan view of an open-sided cavity or pocket formed in the shoreline of a body of land facing the open sea with the open side of the cavity or pocket opening in the direction from which the wave of the open sea advanced toward the shoreline.
Figure 4:
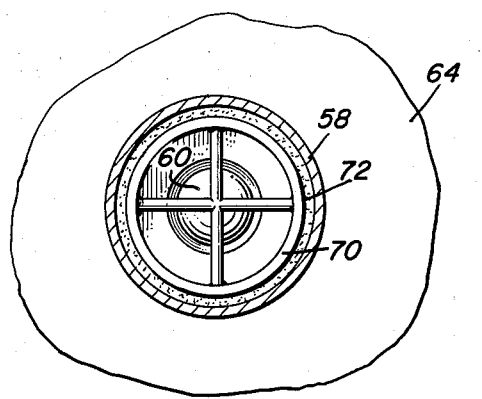
FIGURE 4 is an enlarged fragmentary horizontal sectional view taken substantially upon the plane indicated by the section line 4—4 of FIGURE 2.

Referring now more specifically to the drawings the numeral 10 generally designates the shoreline of a body of land 12 which faces the open sea 14. The shoreline 10 has an open-sided cavity or pocket 16 formed therein including a bottom 18 and with its open side facing in the direction from which the waves 20 of the sea 14 advance upon the cavity 16.

The wave pump of the instant invention is generally designated by the reference numeral 22 and includes support means in part defined by a three-armed web 24 extending across the upper end of the cavity 16. The three-arms 26 of the web 24 are secured together at one set of corresponding ends with the other set of ends thereof radiating outwardly from the first-mentioned set of ends and secured to the portions of the land 12 defining the cavity 16.

Figure 2:
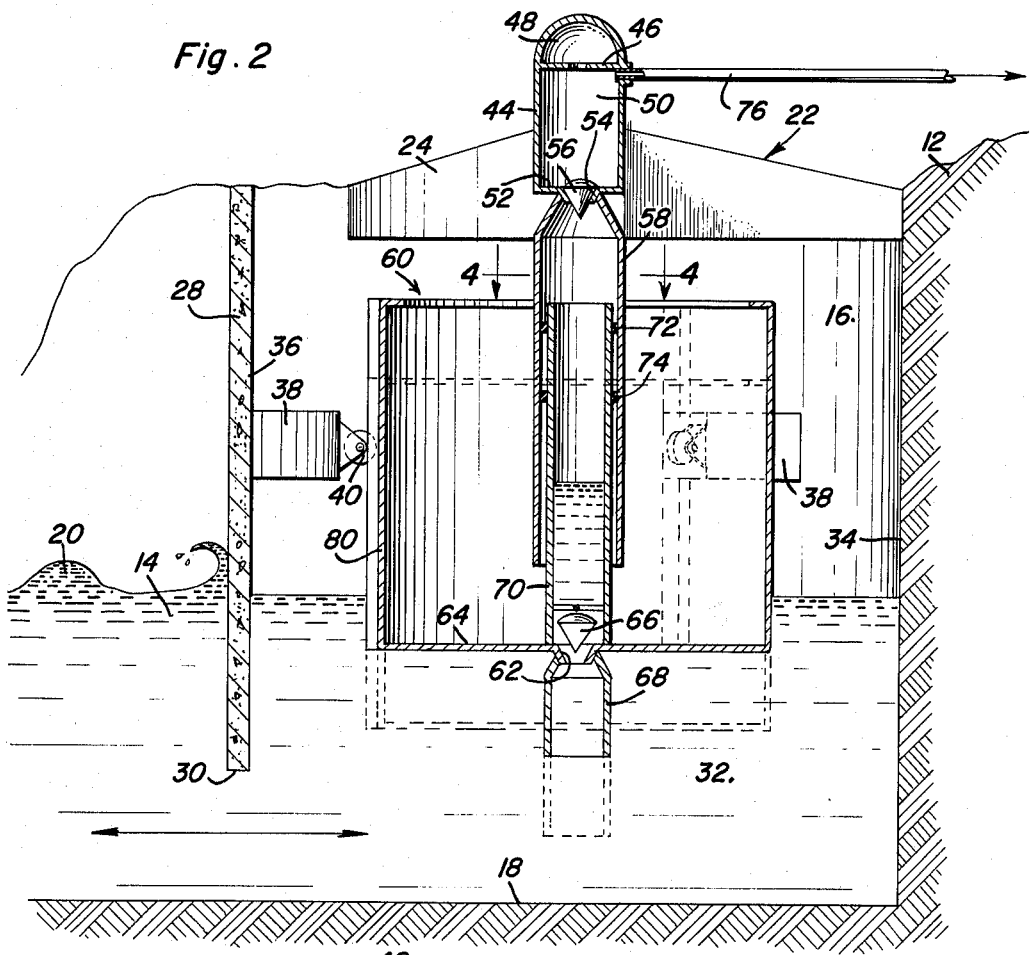
FIGURE 2 is a vertical sectional view taken substantially upon a plane passing through the center of the open-sided cavity or pocket and through the center of the wave pump of the instant invention.
Figure 3:
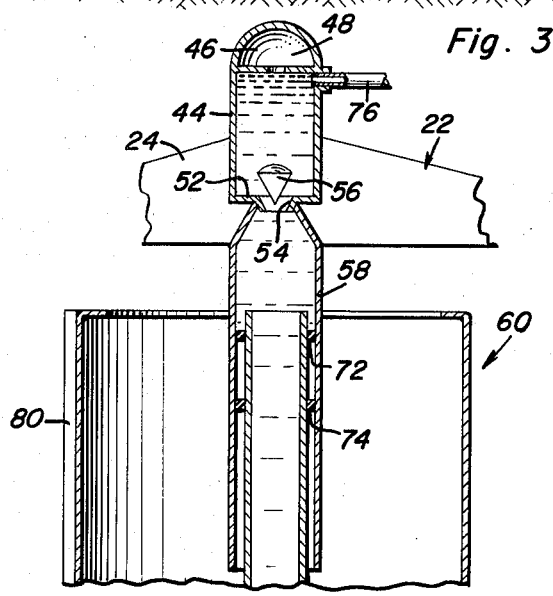
FIGURE 3 is a fragmentary vertical sectional view similar to that of FIGURE 2 but showing some of the movable parts of the wave pump in different positions.

The support means also includes a partial sea wall 28 which extends across the open side of the cavity 16 and terminates at its lower end 30 a spaced distance above the bottom 18 and below the low water level of the ocean 14. The partial sea wall 28 defines a stilling chamber 32 within the lower end of the cavity 16 and it may be seen from FIGURES 1 and 2 of the drawings that the upstanding walls 34 of the cavity 16 and the inner surface 36 of the partial sea wall 28 support a plurality of radially inwardly projecting support members 38 which rotatably journal a plurality of rollers 40 at their innermost ends for rotation about generally horizontally disposed axes. The rollers 40 are disposed in the same horizontal plane and it is to be understood that one or more sets of rollers 40 may also be provided and disposed at different elevations relative to the rollers 40.

A closed air chamber 44 is supported from and between the adjacent ends of the arms or arm members 26 and includes a horizontally disposed apertured baffle 46. The area within the chamber 44 above the baffle 46 defines an upper chamber 48 for maintaining a quantity of air captive therein and the lower chamber 50 disposed below the apertured baffle 46 includes a bottom wall 52 which defines a centrally disposed valve seat 54 with which a check valve member 56 is operatively associated for the purpose of preventing a downward flow of water through the bottom wall 52. The upper end of a first tubular member 58 is supported from the bottom wall 52 and projects downwardly to a point spaced above the bottom 18 of the cavity 16. A buoyant float generally referred to by the reference numeral 60 and in the form of a large cylindrical open top receptacle is provided and has a second valve seat 62 defining an inlet opening in its bottom wall 64. A second valve member 66 is operatively associated with the valve seat 62 to prevent downward flow of fluid through the valve seat 62 and an inlet neck 68 has its upper end secured to the bottom wall 64 about the valve seat 62.

A second tubular member 70 has its lower end secured to the upper surface of the bottom wall 64 about the valve seat 62 and its upper end is telescopingly received within the lower end of the first tubular member 68, there being sealing rings 72 and 74 provided between the confronting surfaces of the tubular members 58 and 70 to form a watertight seal therebetween.

The air chamber 44 is provided with an outlet conduit 76 which opens into the air chamber 44 below the apertured baffle 46 and which may have its outlet end communicated with the inlet of a water turbine or any conventional form of fluid motor.

In operation, as a wave moves against the outer surface of the sea wall 28, the water level within the stilling basin 32 will rise thus forcing the float 60 upwardly closing the check valve member 66 and opening the check valve member 56. Continued upward movement of the float 60 will force the upper portion of the column of water disposed within the tubular members 58 and 70 between the valve members 56 and 66 outwardly through the valve seat 54 and into the air chamber 44. Then, as the water level outside of the sea wall 28 recedes, the water within the stilling chamber 32 will also recede and cause the float 60 to drop within the cavity 16. Inasmuch as the check valve member 66 will remain closed, a partial vacuum is then formed within the tubular members 58 and 70 between the valve members 56 and 66 thereby causing the float valve member 66 to open and to emit sea water into the lower end of the pumping chamber defined by the tubular members 58 and 70. Thereafter, subsequent raising of the float 60 will again force the upper portion of the column of water disposed within the pumping chamber outwardly thereof through the valve seat 54 and into the air chamber 44.

As water is pumped into the air chamber 44, the quantity of air trapped within the upper chamber 48 will be compressed. Then, upon the downward stroke of the float 60, the compressed air within the upper chamber 48 will expand and continue to force water from the air chamber 44 until the float 60 again rises due to the water level within the stilling basin rising as the next wave 20 moves against the sea wall 28.

The buoyant float or receptacle 60 is substantially cylindrical and has a plurality of upstanding and outwardly opening channel-shaped tracks 80 secured thereto and spaced about its circumference. The rollers 40 are rollingly received within the channels 80 and thereby prevent the receptacle 60 from rotating about the longitudinal center axis of the first tubular member 58.

Inasmuch as the partial sea wall 28 blocks all of the horizontal forces of the waves from acting upon the float 60, the means by which the float is guided for vertical reciprocation will last an extremely long period of time.

In addition, it may be seen that the lower valve member 66 is held captive within the lower end of the tubular member 70 by means of a web 82 secured across the tubular member 70 a spaced distance above the valve seat 62. If it is desired, the valve member 56 may also be held captive in a similar manner within the lower end of the inner chamber 44.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wave pump comprising support means defining a depending first tubular member and guide means spaced radially outwardly of and circumferentially about said tubular member, a buoyant float, said guide means guidingly engaging said float for vertical reciprocation of said float relative to said guide means, said float defining a vertical second tubular member, first pressure responsive one-way check valve means in the lower end of said second tubular member preventing downward flow of fluid through said second tubular member and second-pressure-responsive one-way check valve means in the upper end of said first tubular member preventing downward flowing of fluid through said first tubular member, seal means disposed between the telescoped portions of said first and second tubular member and forming a substantially fluid-tight seal therebetween, the upper and lower ends of said first and second tubular members defining fluid outlet and inlet means above and below said second and first one-way check valve means, said support means defining an open-sided cavity including a bottom and a partial sea wall extending across the open side of said cavity and terminating at its lower end a spaced distance above said bottom.

2. The combination of claim 1 wherein said float includes means defining a plurality of vertical track members spaced circumferentially about said float, said guide means including a plurality of wheel means journaled for rotation about horizontal axes, spaced circumferentially about said float and rollingly engaged with said track members.

3. The combination of claim 2 wherein one of said wheel means is supported from said partial sea wall.

4. In combination with a wave pump assembly including a movable actuator, support means defining an open-sided cavity including a bottom, a partial sea wall extending across the open side of said cavity and terminating at its lower end a spaced distance above said bottom, a bouyant float in said cavity, and coacting guide means carried by said support means and said float mounting said float for vertical reciprocation in said cavity, said float being operatively connected to said actuator for actuation thereof in response to vertical reciprocation of said buoyant float.

5. In combination, a wave pump assembly including a movable actuator, a body of water including waves on its surface moving in generally the same direction, stationary support means defining an open-sided cavity extending above and below said surface with its open side facing in a direction substantially opposite to the first-mentioned direction, a partial sea wall extending across the open side of said cavity and of a vertical extent to project above the top of said waves and below the surface of said body of water, the closed sides of said cavity projecting below said partial sea wall, and coacting guide means carried by said support means and said float mounting said float for vertical reciprocation in said cavity, said float being operatively connected to said actuator for actuation thereof in response to vertical reciprocation of said buoyant float.

References Cited by the Examiner

UNITED STATES PATENTS

| | | | |
|---|---|---|---|
| 877,459 | 1/1908 | Binns | 103—70 |
| 2,855,851 | 10/1958 | Shumen | 103—70 |

ROBERT M. WALKER, *Primary Examiner.*